(12) United States Patent
Qiu

(10) Patent No.: US 11,109,623 B2
(45) Date of Patent: Sep. 7, 2021

(54) DRIVER CIRCUIT FOR ELECTRONIC CIGARETTE AND ELECTRONIC CIGARETTE

(71) Applicant: Joyetech Europe Holding GmbH, Zug (CH)

(72) Inventor: Weihua Qiu, Jiangsu (CN)

(73) Assignee: Joyetech Europe Holding GmbH, Zug (CH)

( * ) Notice: Subject to any disclaimer, the term of this patent is extended or adjusted under 35 U.S.C. 154(b) by 353 days.

(21) Appl. No.: 16/264,316

(22) Filed: Jan. 31, 2019

(65) Prior Publication Data

US 2019/0159523 A1 May 30, 2019

Related U.S. Application Data

(63) Continuation-in-part of application No. PCT/CN2017/096619, filed on Aug. 9, 2017.

(30) Foreign Application Priority Data

Aug. 10, 2016 (CN) .......................... 201620864293.2

(51) Int. Cl.
  *H02M 3/158* (2006.01)
  *A24F 40/50* (2020.01)
  *A24F 40/40* (2020.01)
(52) U.S. Cl.
  CPC .............. *A24F 40/50* (2020.01); *A24F 40/40* (2020.01); *H02M 3/1582* (2013.01)
(58) Field of Classification Search
  None
  See application file for complete search history.

(56) References Cited

U.S. PATENT DOCUMENTS 9,974,336 B2 * 5/2018 Xue ........................ A24F 40/50
10,516,336 B2 * 12/2019 Fishelov ............. H02M 3/1582
(Continued)

FOREIGN PATENT DOCUMENTS

CN         104055224 A      9/2014
CN         203849569 U      9/2014
(Continued)

OTHER PUBLICATIONS

"D123110A; Dual Bootstrapped, 12V MOSFET Driver with Output Disable", Semiconductor Components Industries, LLC,2008; Aug. 1, 2008 (Aug. 1, 2008), pp. 1-8, XP055116840; Publication Order No. ADP3110A/D; Retrieved from the Internet: URL:http://www.onsemi.com/pub_link/Collateral/D123110A-D.PDF [retrieved on May 8, 2014].

(Continued)

*Primary Examiner* — Jeffery S Zweizig
(74) *Attorney, Agent, or Firm* — Novick, Kim & Lee, PLLC; Allen Xue

(57) ABSTRACT

A driver circuit for electronic cigarettes includes an MCU, a power source, a first sampling circuit, a second sampling circuit, and a buck-boost driver circuit electrically connected to the MCU, the boosting circuit and MCU are respectively electrically connected the power source. The buck-boost driver circuit comprises a first half bridge drive circuit and a second half bridge drive circuit respectively connected to the MCU. One end of the first sampling circuit is electrically connected to an input terminal of the first half bridge drive circuit, through which the power source supplies power to the first half bridge drive circuit; the other end of the first sampling circuit is electrically connected to the MCU; one end of the second sampling circuit is electrically connected to the output terminal of the second half bridge drive circuit, (Continued)

and the other end of the second sampling circuit is electrically connected to the MCU.

20 Claims, 3 Drawing Sheets

(56) References Cited

U.S. PATENT DOCUMENTS

| | | | |
|---|---|---|---|
| 2009/0039852 A1 | 2/2009 | Fishelov et al. | |
| 2014/0299137 A1 | 10/2014 | Kieckbusch et al. | |
| 2017/0126131 A1* | 5/2017 | Jeong | H02M 3/1582 |
| 2020/0046021 A1* | 2/2020 | Sur | H02J 7/007 |
| 2020/0328681 A1* | 10/2020 | Ou | H02M 3/1582 |
| 2021/0059312 A1* | 3/2021 | Qiu | A24F 40/10 |

FOREIGN PATENT DOCUMENTS

| | | |
|---|---|---|
| CN | 204012951 U | 12/2014 |
| CN | 104783332 A | 7/2015 |
| CN | 105011375 A | 11/2015 |
| CN | 205922901 U | 2/2017 |
| WO | 2013102879 A1 | 7/2013 |
| WO | 2014119040 A1 | 8/2014 |
| WO | 2014173293 A1 | 10/2014 |

OTHER PUBLICATIONS

Linear Technology: "10V, High Efficiency, Synchronous, No Rsense Buck-Boost Controller", LTC3785; Jan. 1, 2007 (Jan. 1, 2007), XP055673808, Retrieved from the Internet: URL:https://www.analog.com/media/en/technical-documentation/data-sheets/3785fc.pdf [retrieved on Mar. 4, 2020].

* cited by examiner

DRIVER CIRCUIT FOR ELECTRONIC CIGARETTE AND ELECTRONIC CIGARETTE

FIELD

The present disclosure relates to the technical field of electronic cigarette, and in particular to a driver circuit for electronic cigarettes and electronic cigarette thereof.

BACKGROUND

Currently, the driver circuit of electronic cigarettes often use the MCU (micro control unit, also called single-chip microcomputer or single-chip microcomputer) to directly control the switching time of the MOS transistor, or use a buck-boost IC to control the switching time of the MOS transistor. However, the MCU directly controls the switching time of the MOS transistor, the output voltage of the circuit is low (not exceeding the battery voltage), and the voltage cannot be adjusted. The use of buck-boost IC, although the voltage regulation function can be realized, but the output power is also relatively small, still can not meet the requirements of high-power output of electronic cigarettes. With the improvement of user demand, the traditional low-power electronic cigarette driving scheme cannot meet the market demand for the product's taste, smoke quantity and product operability requirements. Therefore, there is a need to develop a solution that outputs a large amount of power and an adjustable voltage to improve the performance of electronic cigarettes.

SUMMARY

The present disclosure provides a driver circuit and an electronic cigarette using the driver circuit. The driver circuit can output a large driving power and can adjust the voltage of the electronic cigarette driver circuit to improve the performance of the electronic cigarettes.

A driver circuit for electronic cigarettes includes an MCU, a power source, a first sampling circuit, a second sampling circuit, and a buck-boost driver circuit electrically connected to the MCU, the boosting circuit and MCU are respectively electrically connected the power source; the buck-boost driver circuit comprises a first half bridge drive circuit and a second half bridge drive circuit respectively electrically connected to the MCU, the first half bridge drive circuit is electrically connected to the second half bridge drive circuit through an inductor; one end of the first sampling circuit is electrically connected to an input terminal of the first half bridge drive circuit, through which the power source supplies power to the first half bridge drive circuit; the other end of the first sampling circuit is electrically connected to the MCU; one end of the second sampling circuit is electrically connected to the output terminal of the second half bridge drive circuit, and the other end of the second sampling circuit is electrically connected to the MCU.

In one embodiment, the driver circuit further includes a boosting circuit, the first half bridge drive circuit includes a first half bridge driving chip, two first N-type MOS transistors, the second half bridge drive circuit includes a second bridge driving chip and two second N-type MOS transistors; the first half bridge driving chip and the second half bridge driving chip are respectively electrically connected to the MCU; the first half bridge driving chip and the second half bridge driving chip are further respectively electrically connected to the output terminal of the boosting circuit; the output terminal of the first half bridge driving chip is respectively electrically connected to two first N-type MOS transistors, one of the first N-type MOS transistors is electrically connected to the power source; the output terminal of the second half-bridge driving chip is respectively electrically connected to two second N-type MOS transistors, an output terminal of one of the second N-type MOS transistor supplies a voltage to a load, the first N-type MOS transistors connected in series and the second N-type MOS transistors connected in series are electrically connected together through the inductor.

In one embodiment, the model of the first half bridge driving chip and the model of the second half bridge driving chip are the same.

In one embodiment, the first N-type MOS transistor and the second N-type MOS transistor are the same model of MOS transistors.

In one embodiment, a model of the inductor is MS1004-R68M.

In one embodiment, the driver circuit further includes voltage stabilizing circuit, the voltage stabilizing circuit are respectively electrically connected to the MCU and power source.

In one embodiment, the model of the first half bridge driving chip and the model of the second half bridge driving chip are both ADP3110A.

In one embodiment, the model of the first N-type MOS transistor and the model of the second N-type MOS transistor are SIRA04DP.

A driver circuit for electronic cigarettes includes an MCU, a power source, a first sampling circuit, a second sampling circuit, and a buck-boost driver circuit electrically connected to the MCU, the boosting circuit and MCU are respectively electrically connected the power source; the buck-boost driver circuit includes a first half bridge drive circuit and a second half bridge drive circuit respectively electrically connected to the MCU, the first half bridge drive circuit is electrically connected to the second half bridge drive circuit through an inductor; one end of the first sampling circuit is electrically connected to the power source; the other end of the first sampling circuit is electrically connected to the MCU; one end of the second sampling circuit is electrically connected to the second half bridge drive circuit, and the other end of the second sampling circuit is electrically connected to the MCU.

In one embodiment, the first half bridge drive circuit includes a first half bridge driving chip and two first N-type MOS transistors, the second half bridge drive circuit includes a second bridge driving chips and two second N-type MOS transistors; one end of the first half bridge driving chip is electrically connected to the MCU, the other end of the first half bridge driving chip is respectively electrically connected to the first N-type MOS transistors; one end of the second half bridge driving chip is electrically connected to the MCU, the other end of the second half bridge driving chip is respectively electrically connected to the second N-type MOS transistors.

In one embodiment, the driver circuit further includes a boosting circuit, the first bridge driving chip and the second bridge driving chip are respectively electrically connected to the output terminal of the first half bridge driving chip.

In one embodiment, the first N-type MOS transistors connected in series and the second N-type MOS transistors connected in series are electrically connected together through the inductor.

In one embodiment, the driver circuit further includes voltage stabilizing circuit, one end of the voltage stabilizing circuit is electrically connected to the MCU, the other end of the voltage stabilizing circuit is electrically connected to the power source.

In one embodiment, the model of the first half bridge driving chip and the model of the second half bridge driving chip are the same, the model of the first N-type MOS transistor and the model of the second N-type MOS transistor are the same.

In one embodiment, a model of the inductor is MS1004-R68M.

In one embodiment, the model of the first half bridge driving chip and the model of the second half bridge driving chip are both ADP3110A.

In one embodiment, the model of the first N-type MOS transistor and the model of the second N-type MOS transistor are SIRA04DP.

An electronic cigarette includes any one of the above driver circuits

The beneficial effects of the device are:

With the above solution, the first sampling circuit detects the input voltage of the buck-boost drive circuit supplied by the power source, the second sampling circuit detects the output voltage of the buck-boost drive circuit, the MCU sends the first voltage control command and the second voltage control command according to the voltage fed back by the first sampling circuit and the second sampling circuit; the boosting circuit is configured to increase a voltage of the buck-boost driver circuit according to the first voltage control command of the MCU, to provide a working voltage for the buck-boost driver circuit; the buck-boost driver circuit boosts or lowers a load voltage thereof according to the second voltage control command. Thus, as long as the PWM duty cycle is adjusted by the MCU, the output voltage can be increased, and the output voltage can be adjusted according to different requirements. Therefore, the driver circuit can output a large driving power and can adjust the voltage of the electronic cigarette driver circuit to improve the performance of the electronic cigarettes. In addition, a model of the MOS transistor is SIRA04DP, which has a small on-resistance and a high power, and can minimize the loss in the power conversion of the electronic cigarette.

Figure 1:
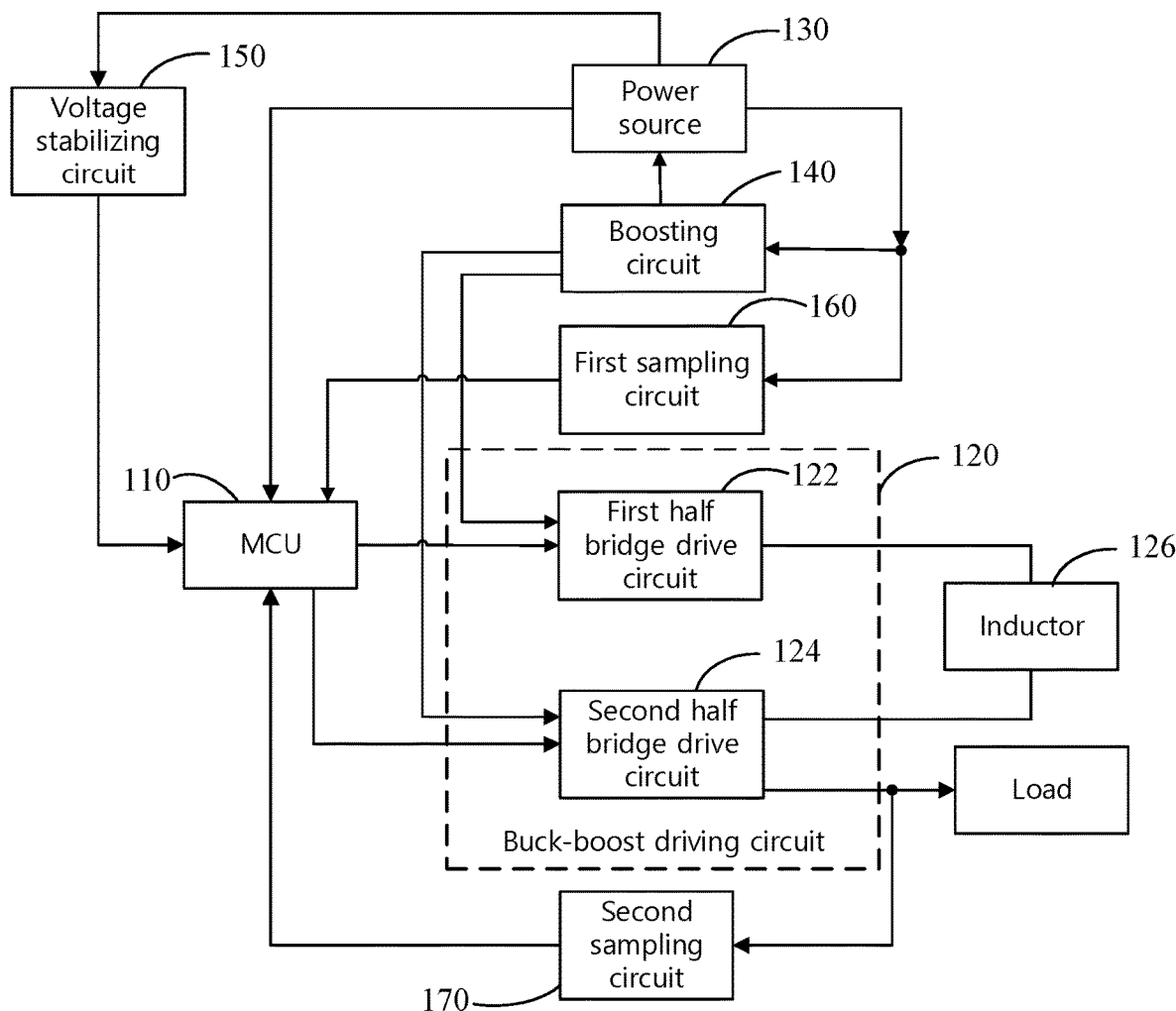
FIG. 1 is a schematic block diagram illustrating one embodiment of a driver circuit for an electronic cigarette according to the present disclosure.

The following table list various components and reference numerals thereof.

| | |
|---|---|
| MCU 110 | First half bridge driving chip U13 |
| Buck-boost driver circuit 120 | Second half bridge driving chip U14 |
| Power source 130, | First N-type MOS transistor U10, U12 |
| Boosting circuit 140 | Second N-type MOS transistor U11, U15 |
| Voltage stabilizing circuit 150 | Inductor 126, L1 |
| Second sampling circuit 170 | Capacitor C5, C6, C8, C11, C14, C20, C30, C31 |
| Diode D5, D9 | second half bridge drive circuit 124 |
| first half bridge drive circuit 122 | |

DETAILED DESCRIPTION OF PREFERRED EMBODIMENTS

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected. The term "comprising," when utilized, means "including, but not necessarily limited to"; it specifically indicates open-ended inclusion or membership in the so-described combination, group, series and the like.

When a feature or element is herein referred to as being "on" another feature or element, it can be directly on the other feature or element or intervening features and/or elements may also be present.

Terminology used herein is for the purpose of describing particular embodiments only and is not intended to be limiting of the disclosure. As used herein, the term "and/or" includes any and all combinations of one or more of the associated listed items and may be abbreviated as "/".

FIG. 1 shows a schematic block diagram of one embodiment of a driver circuit. The driver circuit is configured for electronic devices, such as electronic cigarette. Referring to FIG. 1, the driver circuit includes an MCU 110, a buck-boost driver circuit 120, a power source 130, a boosting circuit 140, a voltage stabilizing circuit 150, a first sampling circuit 160 and a second sampling circuit 170. The buck-boost driver circuit 120, the boosting circuit 140, the voltage stabilizing circuit 150 are respectively electrically connected to the MCU 110. The buck-boost driver circuit 120 and the MCU 110 are respectively electrically connected to the power source 130. The boosting circuit 140, the voltage stabilizing circuit 150 and the buck-boost driver circuit 120 are respectively electrically connected to the power source 130. An output terminal of the boosting circuit 140 is electrically connected to the buck-boost driver circuit 120.

The buck-boost driver circuit 120 includes a first half bridge drive circuit 122 and a second half bridge drive circuit 124 respectively electrically connected to the MCU 110, the first half bridge drive circuit 122 is electrically connected to the second half bridge drive circuit 124 through an inductor 126. One end of the first sampling circuit 160 is electrically connected to an input terminal of the first half bridge drive circuit 122, through which the power source 130 supplies power to the first half bridge drive circuit; the other end of the first sampling circuit 160 is electrically connected to the MCU 110. One end of the second sampling circuit 170 is electrically connected to the output terminal of the second half bridge drive circuit 124, and the other end of the second sampling circuit 170 is electrically connected to the MCU 110. It is to be understood that, in other embodiments, one end of the first sampling circuit 160 is electrically connected to the power source 130, the other end of the first sampling circuit 160 is electrically connected to the MCU 110. One end of the second sampling circuit 170 is electrically connected to the second half bridge drive circuit 124, the other end of the second sampling circuit 170 is electrically connected to the MCU 110

Further, the power source 130 inputs a voltage to the boosting circuit 140, the voltage stabilizing circuit 150, and the buck-boost driver circuit 120. The voltage stabilizing circuit 150 provides a stable operating voltage for the MCU 110. The boosting circuit 140 is configured for receiving a first voltage control command of the MCU 110 to boost a voltage of the buck-boost driver circuit 120 to provide an operating voltage for the buck-boost driver circuit 120. The first sampling circuit 160 is configured to detect an input voltage of the buck-boost driver circuit 120 supplied by the power source 130 (detecting the voltage of the input terminal of the first half bridge drive circuit 122), and feedback to the MCU 110. The second sampling circuit 170 is configured to detect an output voltage of the buck-boost driver circuit 120 (detecting an output voltage of the second half bridge drive circuit 124) and feedback to the MCU 110. The MCU 110 is configured for receiving a voltage fed back by the sampling circuit, and sending the first voltage control command and a second voltage control command according to the feedback voltage. The buck-boost driver circuit 120 is configured to raise or lower a load voltage according to the second voltage control instruction.

With the above solution, the first sampling circuit 160 detects the input voltage of the buck-boost drive circuit supplied by the power source, the second sampling circuit 170 detects the output voltage of the buck-boost drive circuit, the MCU 110 sends the first voltage control command and the second voltage control command according to the voltage fed back by the first sampling circuit 160 and the second sampling circuit 170; the boosting circuit 140 is configured to increase a voltage of the buck-boost driver circuit 120 according to the first voltage control command of the MCU 110, to provide a working voltage for the buck-boost driver circuit 120; the buck-boost driver circuit 120 boosts or lowers a load voltage thereof according to the second voltage control command. Thus, as long as the PWM duty cycle is adjusted by the MCU 110, the output voltage can be increased, and the output voltage can be adjusted according to different requirements. Therefore, the output of the large driving power can be realized, the voltage of the driver circuit of the electronic cigarette can be adjusted, and the performance of the electronic cigarette can be improved.

Figure 2:
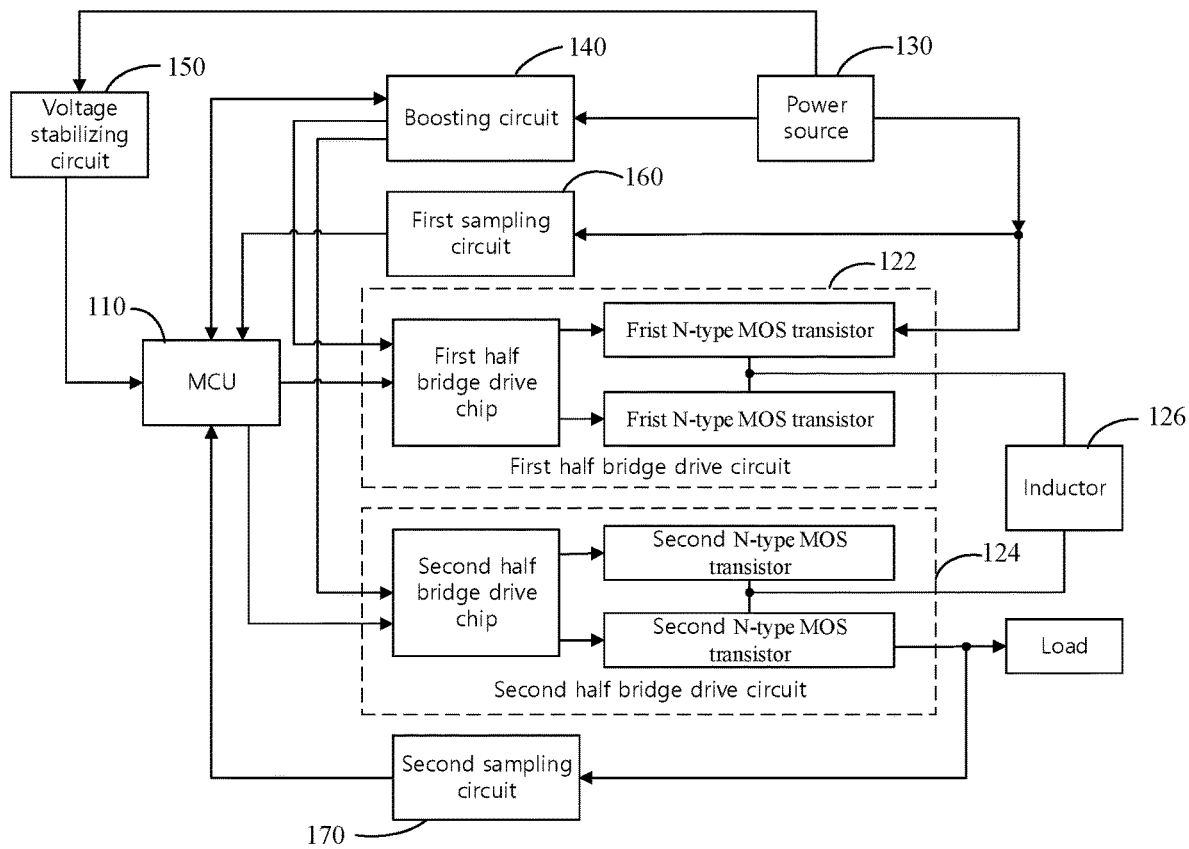
FIG. 2 is a schematic block diagram illustrating another embodiment of a driver circuit for an electronic cigarette.

In one embodiment, as shown in FIG. 2, the first half bridge drive circuit includes a first half bridge driving chip, two first N-type MOS transistors; the second half bridge drive circuit 124 includes a second half bridge driving chips and two second N-type MOS transistors; the first half bridge driving chip and the second half bridge driving chip are respectively electrically connected to the MCU 110, the first half bridge driving chip and the second half bridge driving chip are further respectively electrically connected to the output terminal of the boosting circuit 140. The output terminal of the first half bridge driving chip is respectively electrically connected to two first N-type MOS transistors, one of the first N-type MOS transistors is electrically connected to the power source 130; the output terminal of the second half-bridge driving chip is respectively electrically connected to two second N-type MOS transistors, an output terminal of one of the second N-type MOS transistor supplies a voltage to a load. Two first N-type MOS transistors are electrically connected in series, two second N-type MOS transistors are electrically connected in series, and then the first N-type MOS transistors connected in series and the second N-type MOS transistors connected in series are electrically connected together through the inductor 126. It should be noted that in the embodiment, the inductor 126 is respectively electrically connected to the first N-type MOS transistors and the second N-type MOS transistors.

Figure 3:
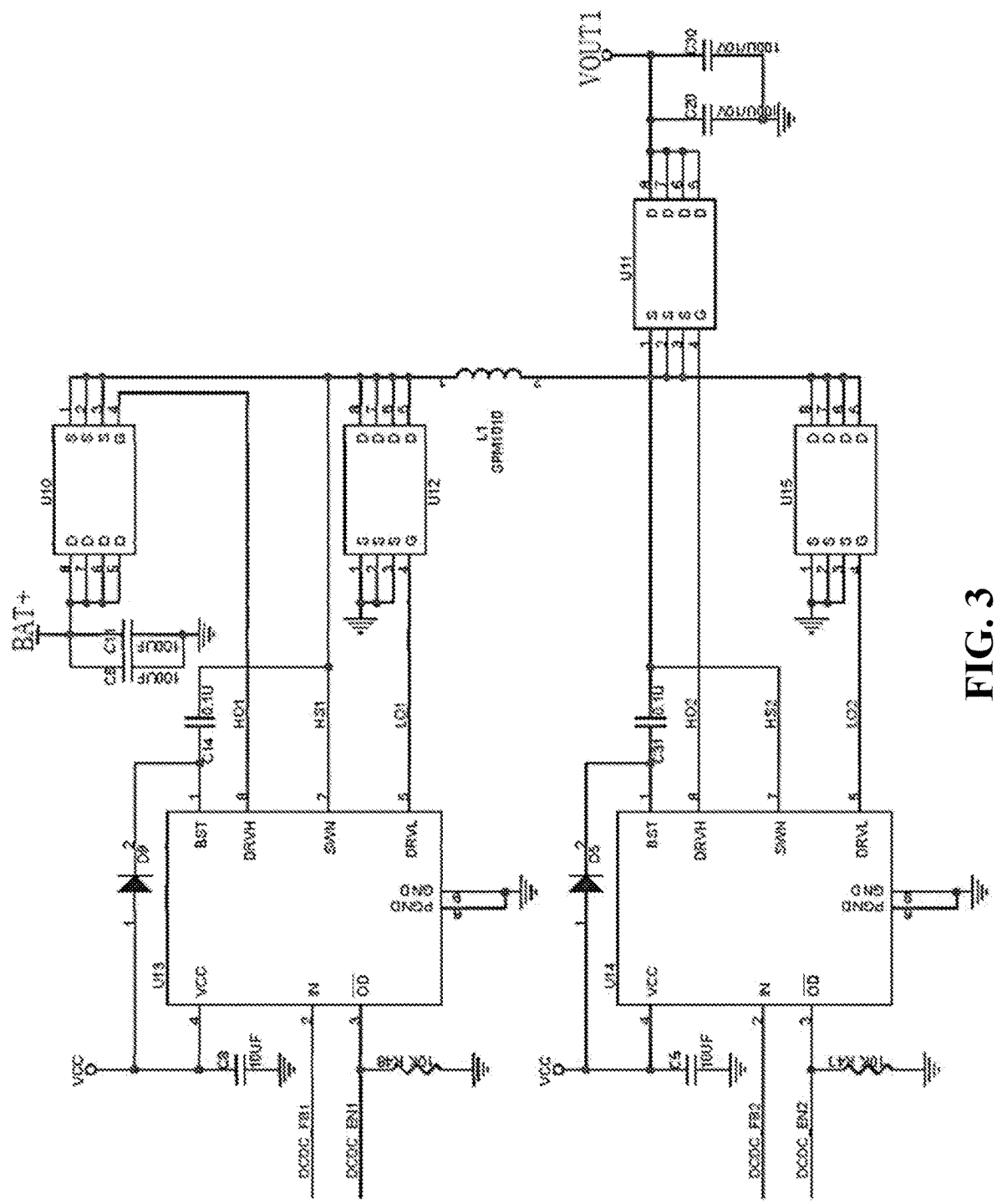
FIG. 3 is an electrical schematic diagram illustrating exemplary first half bridge drive circuit 122 and second half bridge drive circuit 124.

The specific circuit connection of the first half bridge drive circuit 122 and the second half bridge drive circuit is as shown in FIG. 3.

The first half bridge drive circuit includes a first half bridge driving chip U13, a capacitor C6, a capacitor C8, a capacitor C11, a capacitor C14, and a diode D9. Two first N-type MOS transistors U10 and U12 form a first half bridge, the input terminal of the first half bridge is electrically connected to the ground through the capacitor C6 and the capacitor C11 for filtering the input voltage. The first N-type MOS transistors U10 and U12 are respectively electrically connected to the first half bridge driving chip U13. The first half bridge driving chip U13 is electrically connected to the boosting circuit 140, and the first half bridge driving chip U13 is electrically connected to the capacitor C8 for filtering. Pin 4 of the first half bridge driving chip U13 is further electrically connected to pin 1 through the diode D9 for charging the capacitor C14 electrically connected to the pin 1; the capacitor C14 is electrically connected to the output terminal of the first half bridge and pin 7 of the first half bridge driving chip U13. Pins 2 and pin 3 of the first half of the bridge driver chip U13 are respectively electrically connected to the MCU 110. The MCU 110 sends the second voltage control command to control the output of the first half bridge driving chip U13. The first half bridge composed of two first N-type MOS transistors U10 and U12 cooperate with the inductor L1 to reduce the voltage.

The second half bridge drive circuit includes a second half bridge driving chip U14, a capacitor C5, a capacitor C20, a capacitor C30, a capacitor C31, and a diode D5. Two second N-type MOS transistors U11 and U15 form a second half bridge, the input terminal of the second half bridge is electrically connected to the ground through the capacitor C20 and the capacitor C30, respectively, for filtering the input voltage. The second N-type MOS transistors U11 and U15 are respectively connected to the second half-bridge driving chip U14; the second half-bridge driving chip U14 is electrically connected to the boosting circuit140, the second half-bridge driving chip U14 is electrically connected to the capacitor C5 for filtering. The pin 4 of the second half bridge driving chip U14 is also electrically connected to the pin 1 via the diode D5 for charging the capacitor C31 electrically connected to the pin 1, the capacitor C31 is electrically connected to the output terminal of the half bridge and connected to pin 7 of the second half bridge driving chip U14. The second half bridge driving chip U14 is electrically connected to the MCU 110, the MCU 110 sends the second voltage control command to control the output of the second half bridge driving chip U14. The outputs of the two half bridges are connected by the inductor L1. The second half bridge, including the second N-type MOS transistors U11, U15, cooperates with the inductor 126 to act as a booster.

The MCU 110 controls the duration of the turn-on and turn-off times of the MOS transistor through the half-bridge driver circuit to achieve buck-boost. The MCU determines whether the buck or boost output is needed according to the sampling information, and continuously adjusts the PWM control signal to ensure that the output power reaches the set value.

In one embodiment, the model of the first half bridge driving chip U13 and the model of the second half bridge driving chip U14 are the same. Specifically, the model of the first half bridge driving chip U13 and the model of the second half bridge driving chip U14 are both ADP3110A. The above driving chips can accelerate the turn-on and turn-off of the MOS transistor and improve the power supply efficiency. Of course, as long as other models of chips that can implement this function can be used. In other embodiments not shown, the first half bridge driving chip U13 and the second half-bridge driver chip U14 are different models of chips.

In one embodiment, the first N-type MOS transistor and the second N-type MOS transistor are the same model of MOS transistors. A model of the MOS transistor is SIRA04DP, which has a small on-resistance and a high power, and can minimize the loss in the power conversion of the electronic cigarette. In other embodiments, optionally, the first N-type MOS transistor and the second N-type MOS transistor are different models of MOS transistors.

In one embodiment, a model of the inductor 126 can be MS1004-R68M. The MS1004-R68M inductor 126 has the advantages of wide frequency range, high current resistance and good magnetic shielding effect. It can be understood that, this is not a limitation on the types of the MOS transistor and inductor 126, as long as other types of components that can achieve the intended function are also available. In addition, MOS transistor and inductor 126 can determine the maximum output power of the product. The MS1004-R68M inductor 126 is configured to avoid unnecessary loss when used for high-power output of electronic cigarettes.

The present disclosure further provides an electronic cigarette including any one of the above driver circuit.

Those skilled in the art will also be appreciated that, herein incorporated various illustrative logical blocks described in this disclosure, modules, circuits, and algorithm steps may be implemented as electronic hardware, computer software, or both. To clearly illustrate this hardware and software, interchangeability having been generally described, various illustrative components, blocks, modules, circuits, and steps have. This functionality is implemented as software or hardware is implemented depending on the application and design constraints imposed on the overall system. Those skilled in the art for each particular application can be various ways to implement the described functionality, but such implementation decisions should not be interpreted as causing a departure from the scope of the disclosure.

While the foregoing disclosure shows exemplary embodiments of the present disclosure, it should be understood that various changes and modifications may be made without departing from the scope of the disclosure. The functions, steps and/or actions of the method claims according to the embodiments of the disclosure described herein are not required to be performed in any particular order. In addition, although elements of the disclosure may be described or claimed in the form of an individual, many are contemplated, unless explicitly limited to the singular.

Although the description has been made in accordance with the embodiments of the present disclosure as described above, it will be understood by those skilled in the art that the various embodiments of the present disclosure described above may be made without departing from the scope of the disclosure. Improvements. Therefore, the scope of the disclosure should be determined by the content of the appended claims

What is claimed is:

1. A driver circuit for electronic cigarettes, comprising:
    an MCU;
    a power source;
    a first sampling circuit;
    a second sampling circuit, and
    a buck-boost driver circuit electrically connected to the MCU, a boosting circuit and MCU are respectively electrically connected the power source; the buck-boost driver circuit comprises a first half bridge drive circuit and a second half bridge drive circuit respectively electrically connected to the MCU, the first half bridge drive circuit is electrically connected to the second half bridge drive circuit through an inductor; one end of the first sampling circuit is electrically connected to an input terminal of the first half bridge drive circuit, through which the power source supplies power to the first half bridge drive circuit; the other end of the first sampling circuit is electrically connected to the MCU; one end of the second sampling circuit is electrically connected to the output terminal of the second half bridge drive circuit, and the other end of the second sampling circuit is electrically connected to the MCU.

2. The driver circuit according to claim 1, wherein the driver circuit further comprises the boosting circuit, the first half bridge drive circuit comprises a first half bridge driving chip, two first N-type MOS transistors, the second half bridge drive circuit comprises a second bridge driving chip and two second N-type MOS transistors; the first half bridge driving chip and the second half bridge driving chip are respectively electrically connected to the MCU; the first half bridge driving chip and the second half bridge driving chip are further respectively electrically connected to the output terminal of the boosting circuit; the output terminal of the first half bridge driving chip is respectively electrically connected to two first N-type MOS transistors, one of the first N-type MOS transistors is electrically connected to the power source; the output terminal of the second half-bridge driving chip is respectively electrically connected to two second N-type MOS transistors, an output terminal of one of the second N-type MOS transistor supplies a voltage to a load, the first N-type MOS transistors connected in series and the second N-type MOS transistors connected in series are electrically connected together through the inductor.

3. The driver circuit according to claim 2, wherein the model of the first half bridge driving chip and the model of the second half bridge driving chip are the same.

4. The driver circuit according to claim 2, wherein the first N-type MOS transistors and the second N-type MOS transistors are the same model of MOS transistors.

5. The driver circuit according to claim 1, wherein a model of the inductor is MS1004-R68M.

6. The driver circuit according to claim 1, wherein the driver circuit further comprises voltage stabilizing circuit, the voltage stabilizing circuit is respectively electrically connected to the MCU and power source.

7. The driver circuit according to claim 2, wherein the model of the first half bridge driving chip and the model of the second half bridge driving chip are both ADP3110A.

8. The driver circuit according to claim 2, wherein the model of the first N-type MOS transistors and the model of the second N-type MOS transistors are SIRA04DP.

9. An electronic cigarette comprising:
a driver circuit, the driver circuit comprises:
a MCU;
a power source;
a first sampling circuit;
a second sampling circuit, and
a buck-boost driver circuit electrically connected to the MCU, a boosting circuit and MCU are respectively electrically connected the power source; the buck-boost driver circuit comprises a first half bridge drive circuit and a second half bridge drive circuit respectively electrically connected to the MCU, the first half bridge drive circuit is electrically connected to the second half bridge drive circuit through an inductor; one end of the first sampling circuit is electrically connected to an input terminal of the first half bridge drive circuit, through which the power source supplies power to the first half bridge drive circuit; the other end of the first sampling circuit is electrically connected to the MCU; one end of the second sampling circuit is electrically connected to the output terminal of the second half bridge drive circuit, and the other end of the second sampling circuit is electrically connected to the MCU.

10. The electronic cigarette according to claim 9, wherein the driver circuit further comprises the boosting circuit, the first half bridge drive circuit comprises a first half bridge driving chip, two first N-type MOS transistors, the second half bridge drive circuit comprises a second bridge driving chip and two second N-type MOS transistors; the first half bridge driving chip and the second half bridge driving chip are respectively electrically connected to the MCU; the first half bridge driving chip and the second half bridge driving chip are further respectively electrically connected to the output terminal of the boosting circuit; the output terminal of the first half bridge driving chip is respectively electrically connected to two first N-type MOS transistors, one of the first N-type MOS transistors is electrically connected to the power source; the output terminal of the second half-bridge driving chip is respectively electrically connected to two second N-type MOS transistors, an output terminal of one of the second N-type MOS transistor supplies a voltage to a load, the first N-type MOS transistors connected in series and the second N-type MOS transistors connected in series are electrically connected together through the inductor.

11. The electronic cigarette according to claim 10, wherein the model of the first half bridge driving chip and the model of the second half bridge driving chip are the same.

12. The electronic cigarette according to claim 10, wherein the first N-type MOS transistors and the second N-type MOS transistors are the same model of MOS transistors.

13. The electronic cigarette according to claim 9, wherein a model of the inductor is MS1004-R68M.

14. The electronic cigarette according to claim 9, wherein the driver circuit further comprises voltage stabilizing circuit, the voltage stabilizing circuit are respectively electrically connected to the MCU and power source.

15. The electronic cigarette according to claim 10, wherein the model of the first half bridge driving chip and the model of the second half bridge driving chip are both ADP3110A.

16. The electronic cigarette to claim 10, wherein the model of the first N-type MOS transistors and the model of the second N-type MOS transistors is SIRA04DP.

17. A driver circuit for electronic cigarettes, comprising:
an MCU;
a power source;
a first sampling circuit;
a second sampling circuit, and
a buck-boost driver circuit electrically connected to the MCU, a boosting circuit and MCU are respectively electrically connected the power source; the buck-boost driver circuit comprises a first half bridge drive circuit and a second half bridge drive circuit respectively electrically connected to the MCU, the first half bridge drive circuit is electrically connected to the second half bridge drive circuit through an inductor; one end of the first sampling circuit is electrically connected to the power source; the other end of the first sampling circuit is electrically connected to the MCU; one end of the second sampling circuit is electrically connected to the second half bridge drive circuit, and the other end of the second sampling circuit is electrically connected to the MCU.

18. The driver circuit according to claim 17, wherein the first half bridge drive circuit comprises a first half bridge driving chip and two first N-type MOS transistors, the second half bridge drive circuit comprises a second bridge driving chips and two second N-type MOS transistors; one end of the first half bridge driving chip is electrically connected to the MCU, the other end of the first half bridge driving chip is respectively electrically connected to the first N-type MOS transistors; one end of the second half bridge driving chip is electrically connected to the MCU, the other end of the second half bridge driving chip is respectively electrically connected to the second N-type MOS transistors.

19. The driver circuit according to claim 18, wherein the driver circuit further comprises the boosting circuit, the first half bridge driving chip and the second half bridge driving chip are respectively electrically connected to the output terminal of the boosting circuit.

20. The driver circuit according to claim 17 wherein the driver circuit further comprises voltage stabilizing circuit, one end of the voltage stabilizing circuit is electrically connected to the MCU, the other end of the voltage stabilizing circuit is electrically connected to the power source.

* * * * *